US012699503B2

(12) United States Patent
Liu et al.

(10) Patent No.: US 12,699,503 B2
(45) Date of Patent: Aug. 4, 2026

(54) LIVE ROOM CONTROL METHOD, APPARATUS, ELECTRONIC DEVICE, MEDIUM, AND PROGRAM PRODUCT

(71) Applicant: Beijing Zitiao Network Technology Co., Ltd., Beijing (CN)

(72) Inventors: Yan Liu, Beijing (CN); Xiaodong Liu, Beijing (CN); Jinxin Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 89 days.

(21) Appl. No.: 18/761,122

(22) Filed: Jul. 1, 2024

(65) Prior Publication Data

US 2024/0353985 A1 Oct. 24, 2024

Related U.S. Application Data

(63) Continuation of application No. PCT/CN2022/140410, filed on Dec. 20, 2022.

(30) Foreign Application Priority Data

Dec. 29, 2021 (CN) .......................... 202111644447.9

(51) Int. Cl.
G06F 3/0484 (2022.01)
G06F 3/0481 (2022.01)

(52) U.S. Cl.
CPC .......... G06F 3/0484 (2013.01); G06F 3/0481 (2013.01)

(58) Field of Classification Search
CPC ......... G06F 3/048; G06F 3/0484–0486; G06F 3/0481–0483; H04L 12/18; H04N 21/2187
See application file for complete search history.

(56) References Cited

U.S. PATENT DOCUMENTS

2006/0184891 A1* 8/2006 Parker ................... G06F 3/0481
715/767
2009/0113355 A1* 4/2009 Koo ....................... G06F 3/0488
715/863
(Continued)

FOREIGN PATENT DOCUMENTS

CN 105786395 A 7/2016
CN 106534940 A 3/2017
(Continued)

OTHER PUBLICATIONS

QweenWaddles. "Is there any point to having a stream ended scene/video?" May 3, 2020. Reddit.com. <https://www.reddit.com/r/Twitch/comments/gd1iq2/is_there_any_point_to_having_a_stream_ended/> (Year: 2020).*
(Continued)

*Primary Examiner* — Liang Y Li
(74) *Attorney, Agent, or Firm* — Astute IP Law Group

(57) ABSTRACT

The present disclosure provides a live room control method, an apparatus, an electronic device, a medium, and a program product, which allow a target live room to be quickly re-entered after exiting a live room page of the target live room. The method comprises: receiving a first trigger operation for exiting a target live room; and in response to the first trigger operation, stopping displaying a live room page of the target live room, and associating the target live room to a target control.

19 Claims, 5 Drawing Sheets

(56) References Cited

U.S. PATENT DOCUMENTS

| | | | | |
|---|---|---|---|---|
| 2013/0249433 A1* | 9/2013 | Martello | ........... | H05B 47/1965 315/292 |
| 2015/0160853 A1* | 6/2015 | Hwang | .............. | G06F 3/04842 715/720 |
| 2015/0256570 A1* | 9/2015 | Joon | ................... | H04L 65/1069 370/261 |
| 2018/0373403 A1 | 12/2018 | Uemura | | |
| 2020/0294000 A1* | 9/2020 | Sexauer | ............. | H04L 12/1818 |
| 2021/0127171 A1* | 4/2021 | Liu | ....................... | G06F 3/0488 |
| 2023/0100755 A1* | 3/2023 | Oka | ................... | H04L 12/1831 709/204 |
| 2023/0276079 A1* | 8/2023 | Cai | ................... | H04N 21/2187 725/105 |

FOREIGN PATENT DOCUMENTS

| | | | |
|---|---|---|---|
| CN | 107888968 A | | 4/2018 |
| CN | 108521598 A | | 9/2018 |
| CN | 109525850 A | * | 3/2019 |
| CN | 109688420 A | | 4/2019 |
| CN | 110162371 A | | 8/2019 |
| CN | 110417988 A | | 11/2019 |
| CN | 111163324 A | | 5/2020 |
| CN | 111866537 A | | 10/2020 |
| CN | 112235587 A | | 1/2021 |
| CN | 112351300 A | | 2/2021 |
| CN | 113362146 A | | 9/2021 |
| CN | 113613055 A | | 11/2021 |
| CN | 114296611 A | | 4/2022 |
| JP | 2019-008668 A | | 1/2019 |
| JP | 2019-074790 A | | 5/2019 |
| WO | 2021093717 A1 | | 5/2021 |

OTHER PUBLICATIONS

Know How. "Live Broadcasting Gameplay". Published Nov. 8, 20218. Youtube. < https://www.youtube.com/watch?v=zwQ0rdxw6-I> 16:00-20:00. (Year: 2018).*

International Search Report and Written Opinion for International Patent Application No. PCT/CN2022/140410, mailed Feb. 21, 2023 (14 pages).

The first Office Action for Chinese Patent Application No. 202111644447.9, mailed Mar. 30, 2023.

The second Office Action for Chinese Patent Application No. 202111644447.9, mailed Jun. 14, 2023.

Dou Yin V19.0.0 App released on Dec. 21, 2021.

Office Action received for Japanese Patent Application No. 2024-539831, mailed on Aug. 5, 2025, 9 pages (5 pages of English Translation and 4 pages of Original Document).

* cited by examiner receiving a first trigger operation for exiting a target live room          101 in response to the first trigger operation, stopping displaying a live room page of the target live room, and associating the target live room to a target control          102

FIG. 1

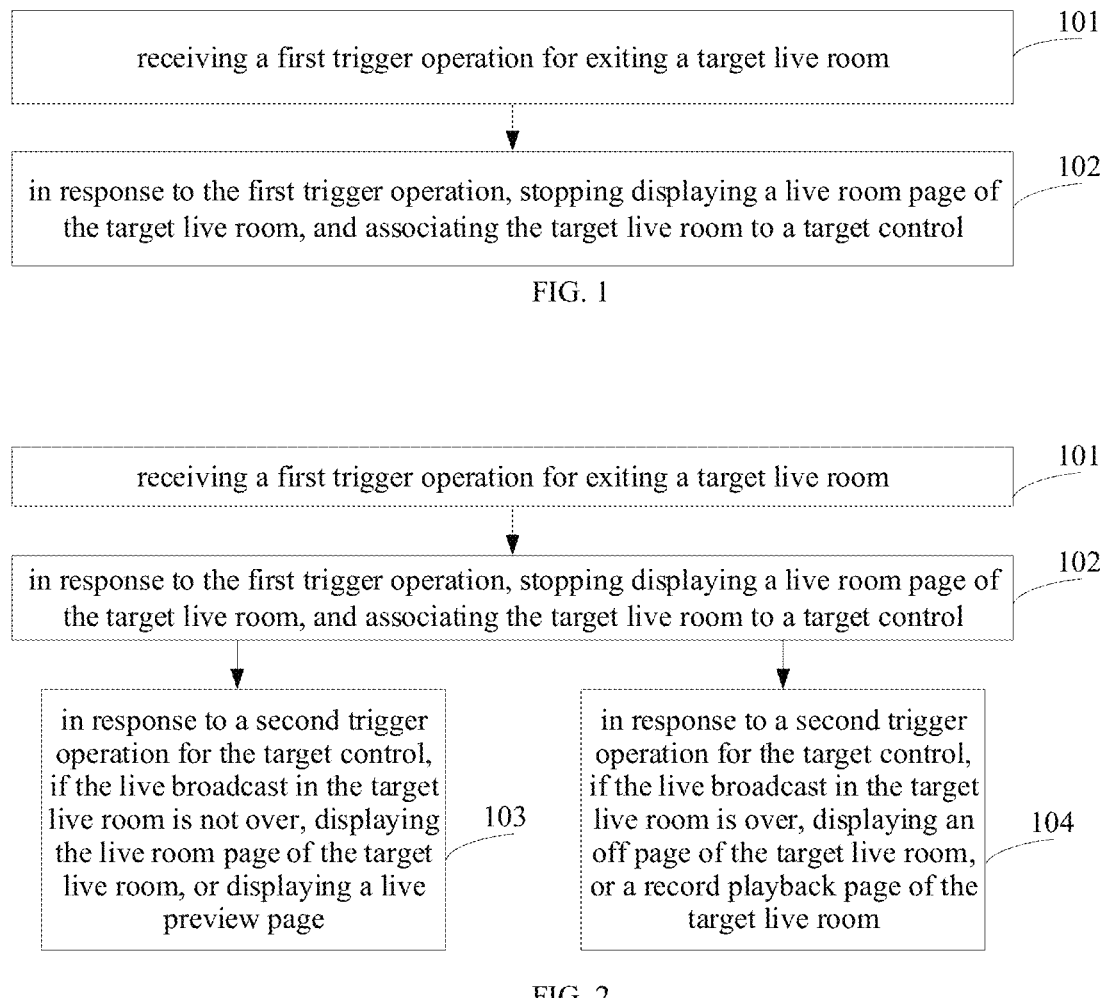

receiving a first trigger operation for exiting a target live room          101 in response to the first trigger operation, stopping displaying a live room page of the target live room, and associating the target live room to a target control          102 in response to a second trigger operation for the target control, if the live broadcast in the target live room is not over, displaying the live room page of the target live room, or displaying a live preview page          103 in response to a second trigger operation for the target control, if the live broadcast in the target live room is over, displaying an off page of the target live room, or a record playback page of the target live room          104

FIG. 2 receiving a first trigger operation for exiting a target live room          101 in response to the first trigger operation, stopping displaying the live room page of the target live room, and displaying a first target page comprising the target control, displaying an identification of the target live room on the target control          102a in response to a second trigger operation for the target control, if the live broadcast in the target live room is not over, displaying the live room page of the target live room, or displaying a live preview page          103 in response to a second trigger operation for the target control, if the live broadcast in the target live room is over, displaying an off page of the target live room, or a record playback page of the target live room          104

FIG. 3A

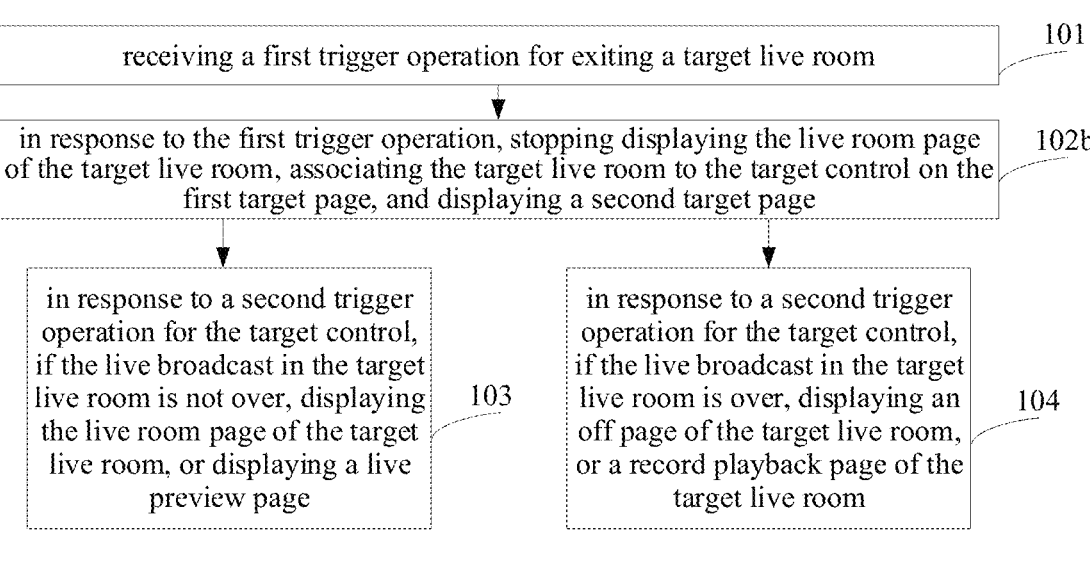

FIG. 3B receiving a first trigger operation for exiting a target live room    101 in response to the first trigger operation, stopping displaying the live room page of the target live room, and displaying a first target page comprising the target control, displaying an identification of the target live room on the target control    102a after a preset duration, undisplaying the identification of the target live room on the target control    105 in response to a second trigger operation for the target control, if the live broadcast in the target live room is not over, displaying the live room page of the target live room, or displaying a live preview page    103 in response to a second trigger operation for the target control, if the live broadcast in the target live room is over, displaying an off page of the target live room, or a record playback page of the target live room    104

LIVE ROOM CONTROL METHOD, APPARATUS, ELECTRONIC DEVICE, MEDIUM, AND PROGRAM PRODUCT

CROSS-REFERENCE TO RELATED APPLICATIONS

The present application is a continuation application of PCT/CN2022/140410 filed on Dec. 20, 2022, which claims priority to and is based on a Chinese application with an application No. 202111644447.9 and a filing date of Dec. 29, 2021, the aforementioned applications are hereby incorporated by reference in their entireties.

FIELD OF THE INVENTION

The present disclosure relates to live streaming technology field, especially relates to a live room control method, apparatus, electronic device, medium and program product.

BACKGROUND

With the tide of Internet, the continuous development and evolution of hardware and software technology promotes the emergence of intelligence devices and software. Meanwhile, the live service technology becomes more and more mature, and can be embedded in different application platform, so that a user can watch news, sporting event, shopping recommendation and other programs online, through the network live streaming.

DISCLOSURE OF THE INVENTION

In order to solve or at least partially solve the above technical problems, the present disclosure provides a live room control method, apparatus, electronic device, medium and program product.

A first aspect of embodiments of the present disclosure proposes a live room control method, the method comprising: receiving a first trigger operation for exiting a target live room; in response to the first trigger operation, stopping displaying a live room page of the target live room, and associating the target live room to a target control.

Alternatively, after the associating the target live room to a target control, the method further comprises: in response to a second trigger operation for the target control, if the live streaming in the target live room is not over, displaying the live room page of the target live room, or displaying a live preview page; wherein the live preview page presents a live video preview stream or preview cover of at least one live room thereon, the at least one live room comprises the target live room.

Alternatively, after the associating the target live room to a target control, the method further comprises: in response to a second trigger operation for the target control, if the live streaming in the target live room is over, displaying an off page of the target live room, or a record playback page of the target live room; wherein the off page presents at least one of live ending prompt message, live guide information and live recommendation information.

Alternatively, the stopping displaying a live room page of the target live room, and associating the target live room to a target control, comprises: stopping displaying the live room page of the target live room, and displaying a first target page comprising the target control, displaying an identification of the target live room on the target control; or, stopping displaying the live room page of the target live room, associating the target live room to the target control on the first target page, and displaying a second target page.

Alternatively, after the displaying the identification of the target live room on the target control, the method further comprises: after a preset duration, stopping displaying the identification of the target live room on the target control.

Alternatively, after a preset duration, stopping displaying the identification of the target live room on the target control, comprises: after the preset duration, stopping displaying the identification of the target live room on the target control according to a first preset effect.

Alternatively, the second trigger operation may refer to a trigger operation for the identification of the target live room received in the preset duration after displaying the identification of the target live room on the target control.

Alternatively, the stopping displaying the live room page of the target live room, and displaying a first target page comprising the target control, displaying an identification of the target live room on the target control, comprises: stopping displaying the live room page of the target live room according to a second preset effect, and displaying a first target page comprising the target control, displaying an identification of the target live room on the target control.

A second aspect of embodiments of the present disclosure proposes a live room control apparatus, the apparatus comprises: a receiving module and a display and association module; wherein the receiving module is configured to receive a first trigger operation for exiting a target live room; the display and association module is configured to, in response to the first trigger operation, stop displaying a live room page of the target live room, and associate the target live room to a target control.

Alternatively, the display and association module is further configured to, after the associating the target live room to a target control, in response to a second trigger operation for the target control, if the live streaming in the target live room is not over, display the live room page of the target live room, or display a live preview page; wherein the live preview page presents a live video preview stream or preview cover of at least one live room thereon, the at least one live room comprises the target live room.

Alternatively, the display and association module is further configured to, after the associating the target live room to a target control, in response to a second trigger operation for the target control, if the live streaming in the target live room is over, display an off page of the target live room, or a record playback page of the target live room; wherein the off page presents at least one of live ending prompt message, live guide information and live recommendation information.

Alternatively, the display and association module is specifically configured to stop displaying the live room page of the target live room, and display a first target page comprising the target control, display an identification of the target live room on the target control; or, stop displaying the live room page of the target live room, associate the target live room to the target control on the first target page, and display a second target page.

Alternatively, the display and association module is specifically configured to, after displaying the identification of the target live room on the target control, after a preset duration, stop displaying the identification of the target live room on the target control.

Alternatively, the display and association module is specifically configured to, after the preset duration, stop displaying the identification of the target live room on the target control according to a first preset effect.

Alternatively, the second trigger operation may refer to a trigger operation for the identification of the target live room received in the preset duration of displaying the identification of the target live room on the target control.

Alternatively, the display and association module is specifically configured to, stop displaying the live room page of the target live room according to a second preset effect, and display a first target page comprising the target control, display an identification of the target live room on the target control.

A third aspect of embodiments of the present disclosure proposes an electronic device, the electronic device comprises a processor and a memory, the memory stores a computer program that can run on the processor thereon, the computer program, when executed by the processor, causes implementation of the steps of video photographing method as described in the first aspect.

A fourth aspect of embodiments of the present disclosure proposes a computer-readable storage medium storing a computer program thereon, the computer program, when executed by a processor, causes the processor to implement the live room control method as described in the first aspect.

A fifth aspect of embodiments of the present disclosure proposes a computer program product, wherein the computer program product comprises a computer program, the computer program product, when running on the processor, causes the processor to execute the computer program, implementing the live room control method as described in the first aspect.

A sixth aspect of embodiments of the present disclosure proposes a chip, the chip comprises a processor and a communication interface, the communication interface is coupled with the processor, wherein the processor is used for running program instructions for implementing the live room control method as described in the first aspect.

A seventh aspect of embodiments of the present disclosure proposes a computer program, the computer program comprises program codes, the program codes, when executed by a computer, cause implementation of the live room control method as described in the first aspect.

DESCRIPTION OF THE DRAWINGS

The accompanying drawings, which are incorporated in and constitute a part of this specification, illustrate embodiments consistent with the disclosure and together with the description, serve to explain the principles of the disclosure.

In order to more clearly explain the technical scheme in the embodiment of the present disclosure or the related technology, the drawings needed in the description of the embodiments or the prior art will be briefly introduced below, obviously, for those ordinary skilled in the art, other drawings can be obtained according to these drawings without paying creative labor.

FIG. 1 is a first one of flowchart diagrams of live room control methods provided by embodiments of the present disclosure;

FIG. 2 is a second one of flowchart diagrams of live room control methods provided by embodiments of the present disclosure;

FIG. 3A is a third one of flowchart diagrams of live room control methods provided by embodiments of the present disclosure;

FIG. 3B is a fourth one of flowchart diagrams of live room control methods provided by embodiments of the present disclosure;

FIG. 4A is a fifth one of flowchart diagrams of live room control methods provided by embodiments of the present disclosure;

DETAILED DESCRIPTION OF PREFERRED EMBODIMENTS

Figure 4B:
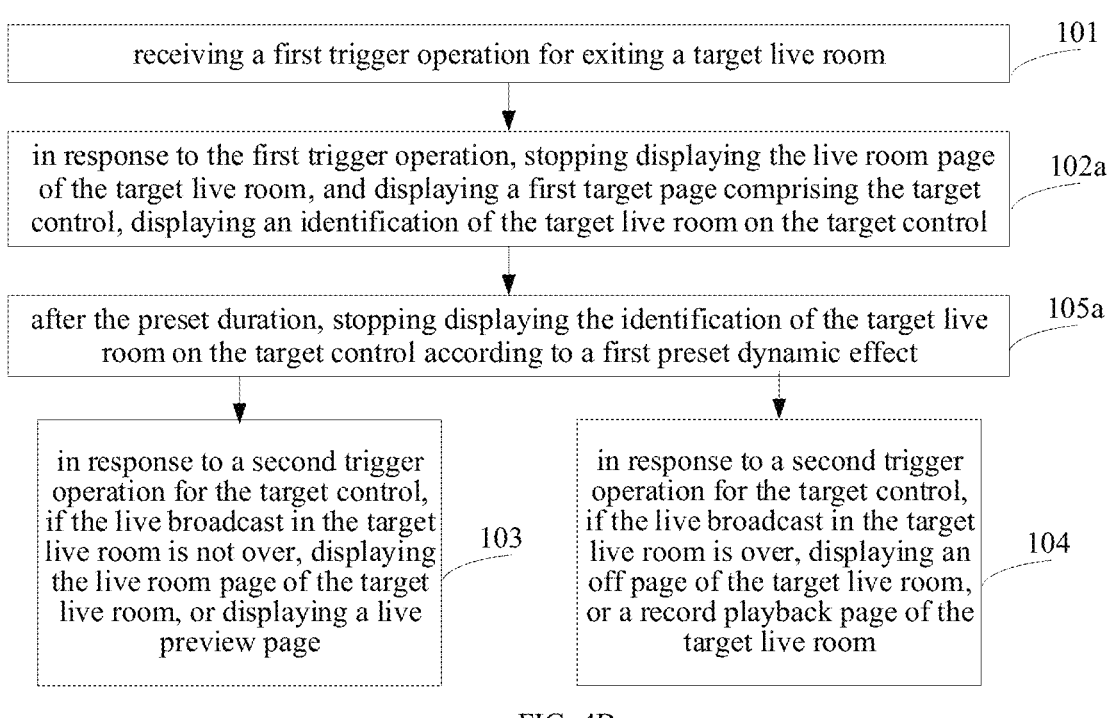
FIG. 4B is a sixth one of flowchart diagrams of live room control methods provided by embodiments of the present disclosure.

In order to be more clearly understood the above object, features and advantages of the present application, the schemes of the present application will be further described hereinafter. It should be noted that embodiments and features in the embodiments of the present application can be combined with each other without conflict.

Many specific details are set forth in the following description to facilitate a thorough understanding of the present application, but the present application may also be practiced in other manners than that described herein; obviously, the embodiments in the specification are only part of, instead of all, embodiments of the present application.

The terms "first" and "second" as used in the description and claims of the present application are used to distinguish similar objects, instead of being used to describe their specific order or sequence. It should be understood that such data can be interchanged in an appropriate case, so that embodiments of the present application can be implemented in any order other than those illustrated or described herein, and the objects distinguished by "first", "second", etc. usually belong to a class, and the number of objects is not limited, for example, the first object may be one or more. In addition, "and/or" in the description and claims represents at least one of the connected objects, character "/" generally represents a relationship between the front and back associated objects is a "or".

When a user temporarily exits a live room page of a target live room, and then wants to watch the live streaming in the target live room again, if the user is concerned with the live room, the user can enter into a message page or a page of interest by means of triggering, since the message page (or the page of interest) may have a large amount of live room identifications, each live room identification being used for indicating a live room, the user needs to find the identification of the live room in the message page (or the page of interest), then click the identification to trigger to enter into the live room again, if the user is not concerned with the live room, then the user may not enter into the live room, or the user needs complex operations to find the live room again, the efficiency is low, which affects the user experience.

In embodiments of the present disclosure, it can receive a first trigger operation for exiting a target live room; in response to the first trigger operation, stop displaying a live room page of the target live room, and associate the target live room to a target control. On the basis of the live room control method provided by embodiments of the present disclosure, the user can leave the live room when needed, and can quickly and conveniently return to the live room after leaving, which is beneficial for short video consumption and other consumption, and can improve the user experience. Furthermore, the live room control method provided by embodiments of the present disclosure can shorten the operation path, simplify the operation manner, provide a function of quickly locating the live room in line with user cognition, and improve the operation efficiency.

The electronic device in embodiments of the present disclosure can be a mobile electronic device, also can be a non-mobile electronic device. The mobile electronic device can be a mobile phone, a tablet computer, a notebook computer, a palm computer, a vehicle electronic device, a wearable device, a ultra-mobile personal computer (UMPC), Internet netbook, or personal digital assistant (PDA) and so on; the non-mobile electronic device may be a personal computer (PC), a television (TV) or the like; the embodiments of the present disclosure are not specifically limited.

The executive subject of the live room control method provided by embodiments of the present disclosure be the above electronic device (comprising a mobile electronic device and a non-mobile electronic device), also can be function module(s) and/or function entity (entities) in the electronic device that can realize the live room control method, which can be specifically determined according to the actual usage requirement, and is not limited in the embodiments of the present disclosure.

The live room control method provided by embodiments of the present disclosure will be described in detail in combination with the accompanying drawings, with reference to specific embodiments and their application scenarios.

As shown in FIG. 1, an embodiment of the present disclosure proposes a live room control method, the method may include the following steps 101 to 102.

101, receiving a first trigger operation for exiting a target live room.

102, in response to the first trigger operation, stopping displaying a live room page of the target live room, and associating the target live room to a target control.

Illustratively, in response to receipt of a first trigger operation for exiting a target live room, displaying a live room page of the target live room is stopped, and the target live room is associated to a target control. Since the target live room is associated to the target control, it can be understood that there exists an association relationship between the target live room and the target control, for example, the target control is associated with an entry path to the target live room, and thus the user can quickly enter into the live room page of the target live room by triggering the target control; or the target control is associated with an identification via which the target live room can be entered into, the identification of the target live room can be displayed through the target control, and the user can quickly enter into the live room page of the target live room via the identification of the target live room; or there may exist other association relationship between the target live room and the target control, and the user can quickly enter into the live room page of the target live room through the target control;

which can be specifically determined according to the actual situation, and is not limited in the embodiments of the present disclosure.

Among them, the live room page of the target live room is namely a live page of the target live room, the live room page of the target live room can be used for displaying a real-time live screen in the target live room, also can display interactive information corresponding to the target live room, the live room page of the target live room is namely a live room interface displaying a live screen in the target live room.

Alternatively, the first trigger operation may include a click input for the live room page of the target live room, also can include a slide input for the live room page of the target live room, further can include other feasible input for the live room page of the target live room, which can be specifically determined according to the actual situation, and is not limited in the embodiments of the present disclosure.

It can be understood that the first trigger operation can be a single touch input or gesture input, also can be a combination input comprising a plurality of touch inputs or gesture inputs, which can be specifically determined according to the actual situation.

Illustratively, the click input can be single-click input, double-click input or a click input without any number of clicks, also can be short-press input or long-press input, and so on; the slide input may be a slide input in any direction, such as a slide up input, a slide down input, a slide left input, a slide right input, a slide clockwise input or a slide anticlockwise input, the slide input also can be double-finger slide input or three-finger slide input and so on.

Alternatively, the first trigger operation can be implemented on a target area in the live room page of the target live room, control movement of the live room page of the target live room, so that the movement distance of the first boundary of the live room page of the target live room is greater than or equal to a preset distance.

Among them, the preset distance can be a preset magnification of a screen size in the movement direction, the preset distance, the preset magnification can be determined according to the actual situation and will not be limited in embodiments of the present disclosure, for example, the preset distance can be half of the screen size, namely the preset magnification is one-half. The target area can be any area on the live room page of the target live room, can be specifically determined according to the actual situation and will not be limited in embodiments of the present disclosure, for example, the target area can be a central area of the screen, a left boundary area of the screen (taking the user operating the mobile phone as reference) and so on. A first boundary can be the upper boundary, the lower boundary, the left boundary or the right boundary of the reference screen taking the user operating the mobile phone as reference, which can be determined according to the actual situation and will not be limited in embodiments of the present disclosure.

Illustratively, the first trigger operation can be a slide right input performed on the left boundary of the screen, in the process of performing the first trigger operation, the live room page of the target live room moves, and the left boundary of the live room page of the target live room moves a distance that is greater than one-half of the screen size.

Alternatively, the first trigger operation can be any input that can cause to exit the live room page of the target live room, the first trigger operation also can be an input other than an input of clicking an exit control on the live room page of the target live room.

Among them, the exit control is used for exiting the live room page of the target live room, the exit control can be "x" control or "exit" control, etc. in the live room page of the target live room.

It can be understood that, if needs to temporarily leave the live room page of the target live room (because the user subsequently needs to return the live room page of the target live room and continue to watch the live room), the user generally can leave the live room page of the target live room by a shortcut, or clicking a notification message, and so on, if the user exits the live room page of the target live room through the exit control, then the user may subsequently not need to continue to watch the live room, therefore, the first trigger operation is the input clicking the exit control on the live room page of the target live room, there is no need to quickly re-enter the live room after exiting, then it is not necessary to associate the target live room to the target control.

Alternatively, the target control can be an existing control in the application program, then the functionality of quickly returning to the live room, which is exited before, can be implemented by multiplexing the existing control, or the target control can be a custom new control which can be displayed on any page of the application program in a suspended manner or in an embedded manner, and the functionality of quickly returning to the live room, which is exited before, can be implemented through the new control, which can be determined according to the actual situation and will not be limited in embodiments of the present disclosure.

Illustratively, the target control can be a control associated with the live function, such as a live square control.

In an embodiment of the present disclosure, the target control can be a live square control, and the functionality of quickly returning to the live room, which is exited before, can be implemented by multiplexing the live square control, which can simplify the development cost, and because the live square control is commonly known to the user, usage of the live square control is convenient for user to understand, and the user experience can be improved.

Illustratively, in response to the first trigger operation of exiting the live room page of the target live room, displaying a live room page of the target live room can be stopped, and the target live room can be associated to a target control.

Alternatively, in response to the first trigger operation, if the duration the user has watched the target live room is greater than or equal to a duration threshold, displaying a live room page of the target live room can be stopped, and the target live room can be associated to a target control. Therefore, it can be determined whether the target live room is to be associated to the target control according to the duration the user has watched the target live room, when the duration the user has watched the target live room is long, indicating the user likes the target live room and the user may continue to watch the target live room subsequently, therefore, the target live room can be associated to the target control, which can more appropriately meet the user requirement and can improve the user experience.

An embodiment of the present disclosure can receive a first trigger operation for exiting a target live room, and in response to the first trigger operation, stop displaying a live room page of the target live room, and associate the target live room to a target control. In the present solution, when the user needs to temporarily leave the live room page of the target live room, the user can trigger to exit the live room page of the target live room through the first triggering operation, and associate the target live room to the target control, so that when the user needs to watch live streaming in the target live room again, the user can trigger the target control to quickly display the live room page of the target live room, so that the user can continue to watch the live streaming in the target live room, compared with entering into the target live room through the message page (or the concerned page), the efficiency of entering into the target live room can be improved, so as to avoid missing the required live streaming content, and the man-machine interaction performance and thereby the user experience can be improved. On the basis of the live room control method provided by embodiments of the present disclosure, the user can leave the live room when needed, and can quickly and conveniently return to the live room after leaving, which is beneficial for short video consumption and other consumption, and can improve the user experience. Furthermore, the live room control method provided by embodiments of the present disclosure can lower the threshold of understanding and shorten the operation path, provide a function of quickly locating the live room in line with user cognition, and improve the operation efficiency.

Furthermore, in some embodiments of the present disclosure, the first trigger operation corresponds to a first time instant, the second trigger operation corresponds to a second time instant, when the second time instant is separate from the first time instant by a duration less than a first preset duration, in response to the second trigger operation for the target control, if the live streaming in the target live room is not over, the live room page of the target live room can be displayed, or a live preview page can be displayed, the live preview page can present a live video preview stream or preview cover of at least one live room thereon, the at least one live room comprises the target live room. When the second time instant is separate from the first time instant by a duration larger than or equal to a first preset duration, in response to the second trigger operation for the target control, a live room page of a recommended live room can be displayed, or the live preview pages of a plurality of recommended live rooms can be displayed.

Alternatively, in conjunction with FIG. 1, as shown in FIG. 2, after the step 102, the live room control method provided by embodiments of the present disclosure further includes the following step 103 or step 104.

103, in response to a second trigger operation for the target control, if the live streaming in the target live room is not over, displaying the live room page of the target live room, or displaying a live preview page.

Among them, the live preview page can present a live video preview stream or preview cover of at least one live room thereon, the at least one live room includes the target live room. The live preview page can present a live video preview stream or preview cover of the target live room thereon, the live preview page can present the streams in double columns or in a single column, the video preview covers or video preview streams corresponding to a plurality of live room can be presented on the live preview interface in the form of list, in response to a second trigger operation for the target control, if the live streaming in the target live room is not over, the displaying the live preview page can be switched to presentation at an area on the live preview page where the video preview cover or video preview stream of the target live room is located, therefore, it is convenient for the user to quickly find the target live room, and it is also convenient for the user to view more other live rooms.

104, in response to a second trigger operation for the target control, if the live streaming in the target live room is over, displaying an off page of the target live room, or a record playback page of the target live room.

Among them, the off page presents at least one of live ending prompt message, live guide information and live recommendation information. The live recommendation information can be live room pages of other live rooms recommended by the user.

Alternatively, the second trigger operation can be a click input for the target control, can also be a slide input for the target control, can also be a click input for an associated identification displayed on the target control, for example, an identification of the target live room in the following step 102*a*, can also be a slide input for the associated identification displayed on the target control, can also be any other feasible input, which can be specifically determined according to the actual situation and will not be limited in embodiments of the present disclosure.

Illustratively, the description of the click input, and the slide input can refer to the description related to the click input and the slide input in the description of the first trigger operation in the step 101, and will not be limited here.

It can be understood that if, after exiting the live room page of the target live room, the user can quickly enter into the target live room through the second trigger operation, if the live streaming in the target live room is not over, the user can continue to watch the live streaming in the live room, if, after exiting the live room page of the target live room, the user enters into the target live room through the second trigger operation, the live streaming in the target live room may be over (i.e., the anchor gets off the air or stop the live streaming), at this time, the record playback page of the target live room can be displayed (i.e., the recorded contents can be playbacked), the off page of the target live room can also be displayed, other live contents can also be displayed, which can be specifically determined according to the actual situation and will not be limited in embodiments of the present disclosure.

Alternatively, the live ending prompt message, live guide information and live recommendation information can be a plurality of thumbnails, each thumbnail indicating different contents, for example, a thumbnail can be the thumbnail of record playback contents in the target live room, a thumbnail can be the live guide information in the target live room, a thumbnail can be the thumbnail of live contents in a recommended live room.

Illustratively, in response to the second trigger operation, if the live streaming in the target live room is over, a prompt message indicating the live streaming in the target live room is over can be displayed, and the thumbnail of record playback page of the target live room and the thumbnail of live room page of at least one recommended live room can be displayed, and the recorded contents in the target live room can be playbacked in respondence to a trigger operation by the user on the thumbnail of the record playback page of the target live room, or, the live contents in a recommended live room can be playbacked in respondence to a trigger operation by the user on the live room page of the recommended live room.

Alternatively, after the step 103 (displaying the live room page of the target live room, or displaying a live preview page) or step 104 (displaying an off page of the target live room, or a record playback page of the target live room), in response to the received input of switching live rooms, the related page of the target live room can be switched to the live room page of another recommended live room. That is, through switching the input for the live room, the live room can be switched (i.e., entering the live stream), in an embodiment of the present disclosure, the basic framework of the live room page is not changed (when displaying the live room page, the live room can be switched through switching the input), the existing functions and function control modes are not changed.

Alternatively, in response to the received input of switching live rooms, if the signal intensity of the network signal is less than or equal to an intensity threshold, displaying the off page of the target live room, and the page can be refreshed every a preset time (e.g., 60 s polling refresh), when refreshing, if the signal intensity of the network signal is greater than the intensity threshold, the off page of the target live room can be switched to the live room page of another recommended live room.

Illustratively, in response to the second trigger operation for the target control, displaying the live room page of the target live room, in response to the received input of switching live rooms, updating the live room page of the target live room to the live room page of the recommended live room.

Alternatively, in response to the second trigger operation, when the signal intensity of the network signal is less than or equal to the intensity threshold, an option of refreshing the current page and an option of exiting the live room page of the target live room can be displayed, and in response to the user input for the option of refreshing the current page, displaying the live room page of the target live room, or in response to the user input for the option of exiting the live room page of the target live room, exiting the live room page of the target live room.

In embodiments of the present disclosure, on the basis of not breaking the existing live room framework, when the user temporarily leaves the current live room, it is possible to provide a function of quickly locating the current live room, and to facilitate quickly returning to the target live room by providing a quick locating path, and to provide a function of quickly locating the live room in line with user cognition, lower the threshold of understanding and shorten the operation path.

In embodiments of the present disclosure, in response to the second trigger operation for the target control, if the live streaming in the target live room is not over, it is possible to directly display the live room page of the target live room, or to trigger to quickly enter into the live room page of the target live room, by an operation on the live video preview stream of the target live room or the preview cover of the target live room in the live preview page, so that the efficiency of entering into the target live room can be enhanced, and the user experience can be improved.

In embodiments of the present disclosure, in response to the second trigger operation for the target control, if the live streaming in the target live room is over, the off page of the target live room can be displayed, therefore, it is possible to prompt the user that the live streaming in the target live room is over; or, in response to the second trigger operation for the target control, if the live streaming in the target live room is over, the record playback page of the target live room can be displayed, therefore, the user can watch the recorded contents of the targe live room when needed.

It should be noted that, with respect to the above step 102, after in response to the first trigger operation, stopping displaying a live room page of the target live room, when displaying the following first page, the functionality of associating the target live room with the target control can be supported. Among them, the first page may include a recommendation page, a live square page, a page of interest, a push page (i.e., a page pushed by the application program to the user) or an external share page and so on in the main interface (home page) of the application program; the first page may further include a search result page, a personal homepage, an information page or a private page and so on in a non-main interface of the application program; the first page can further be other pages in the application program, which can be specifically determined according to the actual situation and will not be limited in embodiments of the present disclosure.

Alternatively, in conjunction with FIG. 2, as shown in FIG. 3A, the above step 102 may be specifically implemented by the following step 102a, or, in conjunction with FIG. 2, as shown in FIG. 3B, the above step 102 may be specifically implemented by the following step 102b.

102a, in response to the first trigger operation, stopping displaying the live room page of the target live room, and displaying a first target page comprising the target control, displaying an identification of the target live room on the target control.

102b, in response to the first trigger operation, stopping displaying the live room page of the target live room, associating the target live room to the target control on the first target page, and displaying a second target page.

It can be understood that if the first trigger operation is used for stopping displaying the live room page of the target live room, and displaying the first target page, the associating the target live room to the target control specifically includes displaying an identification of the target live room on the target control in the first target page; if the first trigger operation is used for stopping displaying the live room page of the target live room, and displaying the first target page, the associating the target live room to the target control specifically includes associating the target live room to the target control in the first target page.

It can be understood that the first target page can be a page including the target control, such as a recommendation page, a live square page, a page of interest, a push page or an external share page and so on included in the first page as described above. The second target page can be a page not including the target control, such as a search result page, a personal homepage, an information page or a private page and so on included in the first page as described above.

Among them, the identification of the target live room can be the head portrait of the anchor, can also be the name of the target live room, also can be the nickname of the anchor, which can be specifically determined according to the actual situation and will not be limited in embodiments of the present disclosure.

It can be understood, after receiving the first trigger operation, in response to the first trigger operation, stopping displaying the live room page of the target live room (i.e., exiting the live room page of the target live room), and displaying the identification of the target live room on the target control, it can well prompt the user that the target live room is associated to the target control, the user can quickly return the target live room to continue watching through the operation on the target control.

Illustratively, in response to the first trigger operation, stopping displaying the live room page of the target live room, displaying the first target page including a target control, displaying the identification of the target live room on the target control.

In embodiments of the present disclosure, the displaying the identification of the target live room on the target control can play a role in prompting the user, can prompt the user that the live room being watched currently is associated to the target control, so that the user can quickly enter into the target live room through the operation on the target control when needed.

In embodiments of the present disclosure, by stopping displaying the live room page of the target live room, displaying a second target page not including the target control, associating the target live room to the target control in the first target page (the first target page can be a main interface), it is convenient for the user, when needs to watch the live streaming in the target live room again, to quickly enter into the live room page of the target live room through the target control on the first target page, which can improve the operation efficiency.

Alternatively, in conjunction with FIG. 3A, as shown in FIG. 4A, after the step 102a, the live room control method provided by embodiments of the present disclosure further includes the following step 105.

105, after a preset duration, stopping displaying the identification of the target live room on the target control.

Among them, the preset duration can be determined according to the actual usage requirement and is not limited in embodiments of the present disclosure. For example, the preset duration can be 1 s.

It can be understood that displaying the identification of the target live room on the target control is for prompting the user that the target live room is associated to the target control, therefore, after the preset duration, displaying the identification of the target live room can be stopped, an initial display pattern of the target control can be recovered, which is convenient for the user to use.

Illustratively, after the preset duration, displaying the identification of the target live room can be stopped on the target control.

In embodiments of the present disclosure, in response to the first trigger operation, the identification of the target live room is displayed on the target control, and after the preset duration, stopping the identification of the target live room can be stopped, therefore, by means of the dynamic change process with firstly displaying the identification of the target live room and then stopping displaying the identification of the target live room, the prompt effect can be enhanced through a dynamic change effect, which can better prompt the user, and it is convenient for user to know a new function.

Alternatively, in conjunction with FIG. 4A, as shown in FIG. 4B, the above step 105 may be realized by the following step 105a.

105a, after the preset duration, stopping displaying the identification of the target live room on the target control according to a first preset effect.

Among them, the first preset effect can be a preset effect of the identification of the target live room slowly shrinking until disappearance, also can be a preset effect of the identification of the target live room rotationally shrinking until disappearance, also can be other preset effects, which are not limited in the embodiments of the present disclosure.

Illustratively, after the preset duration, displaying the identification of the target live room is stopped on the target control according to a first preset effect.

In embodiments of the present disclosure, the process of stopping displaying the identification of the target live room can be presented through the first preset effect, which can enhance the prompting effect and can better prompt the user, and it is convenient for user to know a new function, and the user experience can be improved.

Alternatively, the second trigger operation may refer to a trigger operation for the identification of the target live room received in the preset duration after displaying the identification of the target live room on the target control.

It can be understood that embodiments of the present disclosure, in the preset duration after displaying the identification of the target live room on the target control, the identification of the target live room displayed on the target control does not disappear, then the second trigger operation may be a trigger operation for the identification of the target live room, and after the preset duration after displaying the identification of the target live room on the target control, the identification of the target live room displayed on the target control disappears, then the second trigger operation may be a trigger operation for the target control.

In embodiments of the present disclosure, different second trigger operations can be determined according to whether the identification of the target live room is displayed on the target control, when the identification of the target live room is displayed on the target control, through the second trigger operation for the identification of the target live room, the related page of the target live room can be quickly entered, especially if the user exits the live room due to false trigger, which can enhance the prompting effect and can better prompt the user, so that the user can quickly enter into the target live room through the second trigger operation for the identification of the target live room.

Figure 5:
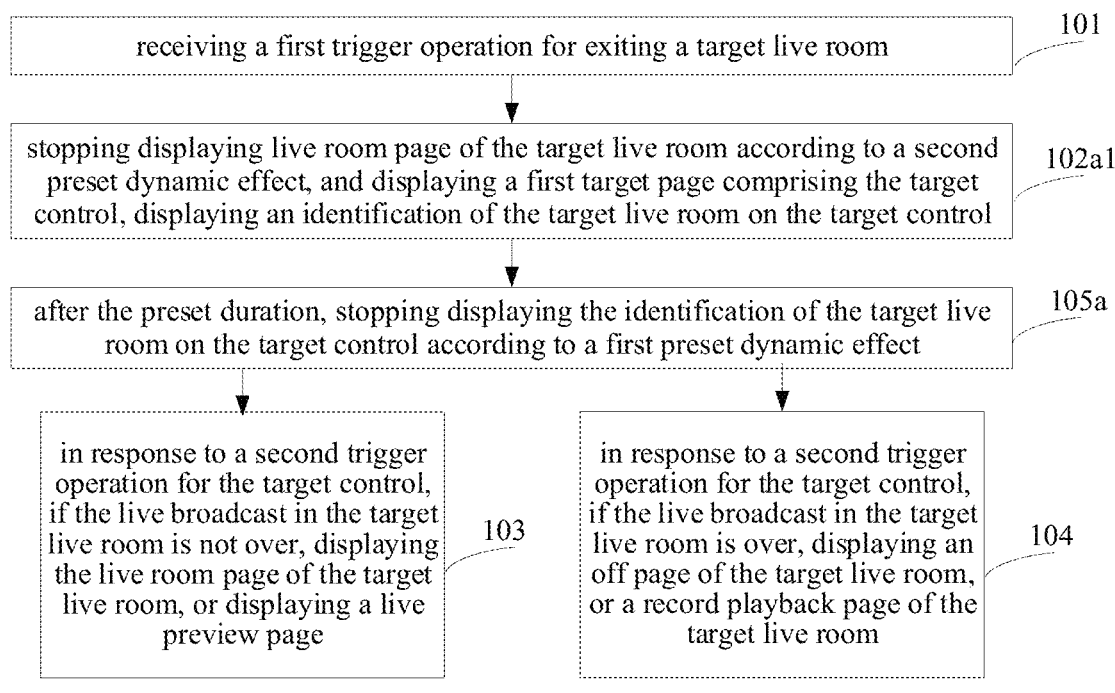
FIG. 5 is a seventh one of flowchart diagrams of live room control methods provided by embodiments of the present disclosure.

Alternatively, in conjunction with FIG. 4B, as shown in FIG. 5, the step 102a specifically can be realized by the following steps 102a1.

102a1. stopping displaying the live room page of the target live room according to a second preset effect, and displaying a first target page comprising the target control, displaying an identification of the target live room on the target control.

Illustratively, according to the second preset effect, the live room page of the target live room can be collapsed to the identification of the target live room, and the first target page comprising the target control can be displayed, the identification of the target live room is moved onto the target control.

Among them, the second preset effect can include a preset effect of collapsing the live room page of the target live room to the identification of the target live room and displaying the first target page comprising the target control, or a preset effect of the identification of the target live room moving onto the target control, and can also include a preset effect of the identification of the target live room rotating in the process of movement of the identification of the target live room, and can also include any other feasible preset effect, which can be specifically determined according to the actual situation, and is not limited in the embodiments of the present disclosure.

In embodiments of the present disclosure, in the process of in response to the first trigger operation, stopping displaying the live room page of the target live room, and displaying a first target page comprising the target control, displaying an identification of the target live room on the target control, the live room page of the target live room can be collapsed to the identification of the target live room according to the second preset effect, and the first target page comprising the target control can be displayed, the identification of the target live room can be moved onto the target control, the dynamic change can present the user a more intuitive change experiment of the live room page of the target live room, and it is convenient for the user to know a new function of the live room page of the target live room, and by means of the dynamic change process, it is more beneficial for the user to understand the new function of the live room page of the target live room, the prompt effect for the user can be enhanced.

Alternatively, the second preset effect may be that in the process of collapsing the live room page of the target live room to the target live room identification (collapsing effect), moving to the target control (movement effect), namely the collapsing effect and the movement effect are performed concurrently.

It can be understood, the second effect can be a preset effect of collapsing the live room page of the target live room (collapsing the live room page of the target live room to the identification of the target live room) while moving (in the process of moving to the target control).

Alternatively, the second preset effect comprises a collapsing animation of collapsing the live room page of the target live room to the identification of the target live room, and a moving animation of moving the identification of the target live room to the target control.

It can be understood that the second preset effect is firstly a collapsing preset effect of displaying a first target page while collapsing the live room page of the target live room to the identification of the target live room, and then a moving preset effect of moving the identification of the target live room to the target control.

In embodiments of the present disclosure, a plurality of patterns of the second preset effect can be provided, and an appropriate second preset effect can be set specifically according to the actual requirement, which plays a role in prompting the user and facilitating the user to understand the new function.

It should be noted that, if the target control is live square control, when in response to the first trigger operation, stopping displaying the live room page of the target live room, displaying the following second page, the step 102a (displaying the identification of the target live room on the target control), step 102a1 (according to a second preset effect, collapsing the live room page of the target live room to the identification of the target live room, displaying a first target page comprising the target control, displaying an identification of the target live room on the target control), step 105 (after a preset duration, stopping displaying the identification of the target live room on the target control) and step 105a (after the preset duration, stopping displaying the identification of the target live room on the target control according to a first preset effect) can be supported. Among them, the second page may include a recommendation page, a live square page, a page of interest, a push page (i.e., a page pushed by the application program to the user) or an external share page and so on in the main interface (home page) of the application program, which page the first page is can be specifically determined according to the actual situation and will not be limited in embodiments of the present disclosure. If the target control is a custom new control, when in response to the first trigger operation, stopping displaying the live room page of the target live room, displaying the page comprising the target control, the step 102a (displaying the identification of the target live room on the target control), step 102a1 (according to a second preset effect, collapsing the live room page of the target live room to the identification of the target live room, displaying a first target page comprising the target control, displaying an identification of the target live room on the target control), step 105 (after a preset duration, stopping displaying the identification of the target live room on the target control) and step 105a (after the preset duration, stopping displaying the identification of the target live room on the target control according to a first preset effect) can be supported.

Figure 6:
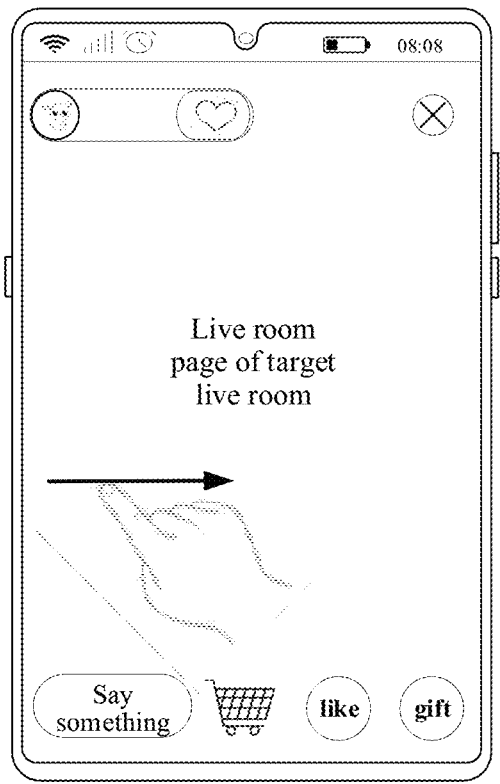
FIG. 6 is a first one of interface diagrams of live room control methods provided by embodiments of the present disclosure.
Figure 7:
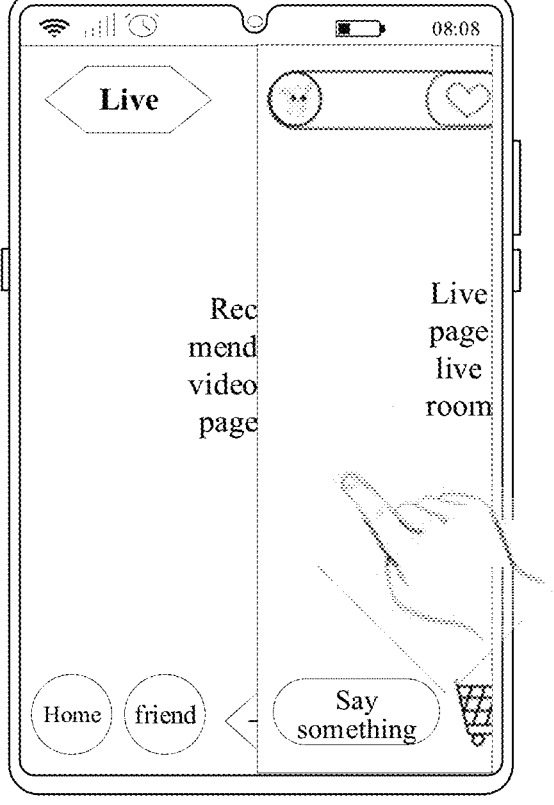
FIG. 7 is a second one of interface diagrams of live room control methods provided by embodiments of the present disclosure.
Figure 8:
FIG. 8 is a third one of interface diagrams of live room control methods provided by embodiments of the present disclosure.

Exemplary, as shown in FIG. 6, the live room page of the target live room is currently displayed, the first trigger operation is the slide right input carried out by user on the live room page of the target live room, as shown in FIG. 7, in the process of the first trigger operation, the left boundary of the live room page of the target live room can move along with the first triggering operation, when the moving distance of the left boundary of the live room page of the target live room is larger than one half of the screen size, as shown in FIG. 8, the live room page of the target live room is collapsed to the identification of the target live room, and the recommended short video page is displayed, and then the identification of the target live room is moved to and displayed on the live square control, and the second preset effect is that in the process of moving to the live square control, the live room page of the target live room is collapsed to the identification of the target live room control, after 1s, the identification of the target live room shrinks and disappears (the first preset effect) on the live square control.

Figure 9:
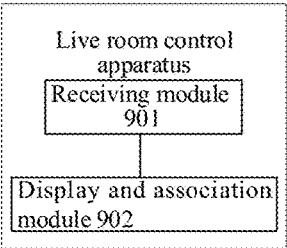
FIG. 9 is a structural block diagram of a live room control apparatus provided by an embodiment of the present disclosure.

FIG. 9 is a structural block diagram of a live room control apparatus provided by an embodiment of the present disclosure, as shown in FIG. 9, comprising: a receiving module 901 and a display and association module 902; the receiving module 901 is configured to receive a first trigger operation for exiting a target live room; the display and association module 902 is configured to, in response to the first trigger operation, stop displaying a live room page of the target live room, and associate the target live room to a target control.

Alternatively, the display and association module 902 can be further configured to, after the associating the target live room to a target control, in response to a second trigger operation for the target control, if the live streaming in the target live room is not over, display the live room page of the target live room, or display a live preview page; wherein the live preview page presents a live video preview stream or preview cover of at least one live room thereon, the at least one live room comprises the target live room.

Alternatively, the display and association module 902 can be further configured to, after the associating the target live room to a target control, in response to a second trigger operation for the target control, if the live streaming in the target live room is over, display an off page of the target live room, or a record playback page of the target live room; wherein the off page presents at least one of live ending prompt message, live guide information and live recommendation information.

Alternatively, the display and association module 902 can be specifically configured to stop displaying the live room page of the target live room, and display a first target page comprising the target control, display an identification of the target live room on the target control; or, stop displaying the live room page of the target live room, associate the target live room to the target control on the first target page, and display a second target page.

Alternatively, the display and association module 902 can be configured to, after displaying the identification of the target live room on the target control, after a preset duration, stop displaying the identification of the target live room on the target control.

Alternatively, the display and association module 902 can be specifically configured to, after the preset duration, stop displaying the identification of the target live room on the target control according to a first preset effect.

Alternatively, the second trigger operation may refer to a trigger operation for the identification of the target live room received in the preset duration of displaying the identification of the target live room on the target control.

Alternatively, the display and association module 902 can be specifically configured to, stop displaying the live room page of the target live room according to a second preset effect, and display a first target page comprising the target control, display an identification of the target live room on the target control.

In embodiments of the present disclosure, each module can realize the live room control method provided by the above method embodiments, and can achieve the same technical effect, to avoid repetition, which will not be repeated here. It should be noted that the above-mentioned modules and/or units are only logical modules divided according to the specific functions they realize, instead of being used to limit specific implementation, for example, they can be implemented in software, hardware, or a combination of software and hardware. In actual implementation, each of the above modules and/or units may be implemented as an independent physical entity, or may also be implemented by a single entity (for example, a processor (CPU or DSP, etc.), an integrated circuit, etc.).

In embodiments of the present disclosure, there is proposed a computer program product, wherein the computer program product comprises a computer program, the computer program product, when running on the processor, causes the processor to execute the computer program, implementing the live room control method as described in embodiments of the present disclosure.

In embodiments of the present disclosure, there is proposed a chip, the chip comprises a processor and a communication interface, the communication interface is coupled with the processor, wherein the processor is used for running program instructions for implementing the live room control method as described in embodiments of the present disclosure.

In embodiments of the present disclosure, there is proposed a computer program, the computer program comprises program codes, the program codes, when executed by a computer, cause implementation of the live room control method as described in embodiments of the present disclosure.

Figure 10:
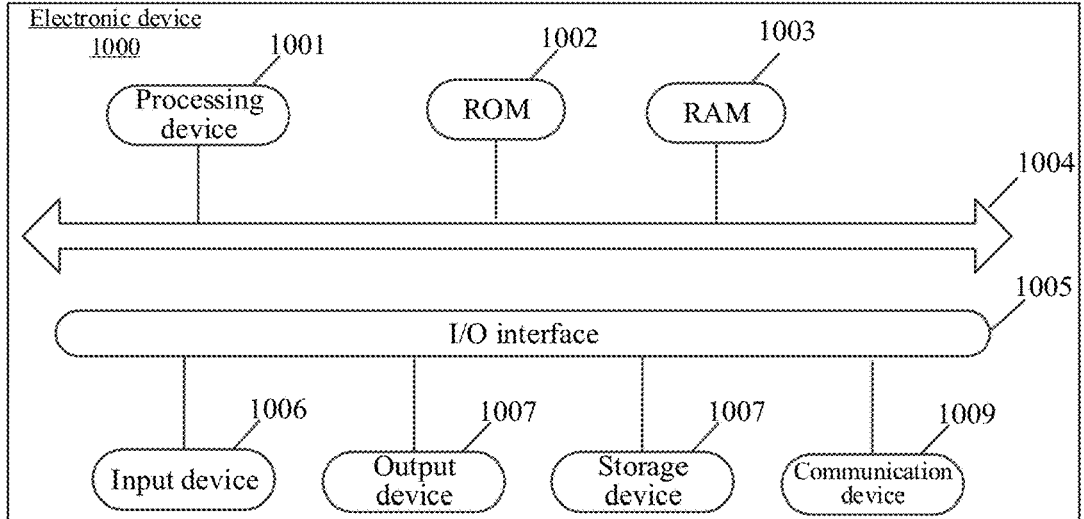
FIG. 10 is a structural block diagram of an electronic device provided by an embodiment of the present disclosure.

FIG. 10 is a structural schematic diagram of an electronic device provided by the embodiment of the application, for illustrating the electronic device for implementing the live room control method in the embodiments of the present disclosure, should not be understood as specific limitation for the embodiments of the present disclosure.

As shown in FIG. 10, the electronic device 1000 can include a processing apparatus (such as a central processing unit, a graphics processor, etc.) 1001, which can perform various appropriate actions and processes according to a program stored in a Read Only Memory (ROM) 1002 or a program loaded into a Random Access Memory (RAM) 1003 from a storage device 1008. In the RAM 1003, various programs and data required for the operation of the electronic device 1000 are also stored. The processing device 1001, ROM 1002 and RAM 1003 are connected to each other through a bus 1004. An input/output (I/O) interface 1005 is also connected to the bus 1004.

Generally, the following devices can be connected to the I/O interface 1005: an input device 1006 including, for example, touch screen, touch pad, keyboard, mouse, camera, microphone, accelerometer, gyroscope, etc.; an output device 1007 such as Liquid Crystal Display (LCD), speakers, vibrators, etc.; a storage device 1008 including a magnetic tape, a hard disk, etc.; and a communication device

1009. The communication device 1009 may allow the electronic device 1000 to communicate with other devices wirelessly or in wired so as to exchange data. Although an electronic device 1000 with various devices is shown, it should be understood that it is not required to implement or have all the devices shown. More or fewer devices may alternatively be implemented or provided.

Particularly, according to embodiments of the present disclosure, the process described above with reference to the flowchart can be implemented as a computer software program. For example, an embodiment of the present disclosure includes a computer program product including a computer program carried on a computer readable medium, the computer program containing program code for executing the method shown in the flowchart. In such an embodiment, the computer program can be downloaded and installed from the network through the communication device 1009, or installed from the storage device 1008 or from the ROM 1002. When executed by the processing device 1001, the computer program carries out the above-mentioned functions defined in the method of the embodiment of the present disclosure.

It should be noted that the above-mentioned computer-readable medium in this disclosure can be a computer-readable signal medium or a computer-readable storage medium or any combination of the two. The computer-readable storage medium can be, for example, but not limited to, an electrical, magnetic, optical, electromagnetic, infrared, or semiconductor system, device or equipment, or any combination of the above. More specific examples of computer-readable storage media may include, but not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium can be any tangible medium that contains or stores a program that can be used by or in combination with an instruction execution system, device, or equipment. In this disclosure, the computer-readable signal medium may include a data signal propagated in baseband or as a part of a carrier wave, in which computer-readable program code is carried. This propagated data signal can take many forms, including, but not limited to, electromagnetic signals, optical signals, or any suitable combination of the above. The computer-readable signal medium can also be any computer-readable medium other than the computer-readable storage medium, which can send, propagate, or transmit the program for use by or in connection with the instruction execution system, apparatus, or device. The program code contained in the computer-readable medium can be transmitted by any suitable medium, including but not limited to: electric wire, optical cable, RF (radio frequency), etc., or any suitable combination of the above.

In some embodiments, the client and the server can communicate by using any currently known or future developed network protocol such as HTTP (HyperText Transfer Protocol), and can be interconnected with any form or medium of digital data communication (e.g., communication network). Examples of communication networks include a local area network ("LAN"), a wide area network ("WAN"), an internet network (e.g., the Internet) and end-to-end network (e.g., ad hoc end-to-end network), as well as any currently known or future developed networks.

The above-mentioned computer-readable medium may be included in the electronic device; or it can exist alone without being loaded into the electronic device.

The above-mentioned computer-readable medium carries one or more programs, which, when executed by the electronic device, cause the electronic device to execute the following: receiving a first trigger operation for exiting a target live room; in response to the first trigger operation, stopping displaying a live room page of the target live room, and associating the target live room to a target control.

In embodiments of the present disclosure, computer program codes for performing the operations of the present disclosure can be written in one or more programming languages or a combination thereof, including object-oriented programming languages such as Java, Smalltalk, and C++, as well as conventional procedural programming languages such as "C" language or similar programming languages. The program codes can be completely executed on the user's computer, partially executed on the user's computer, executed as an independent software package, partially executed on the user's computer, and partially executed on the remote computer, or completely executed on the remote computer or server. In a case related to remote computers, the remote computers can be connected to the user computers through any kind of networks, including Local Area Network (LAN) or Wide Area Network (WAN), or can be connected to external computers (for example, through the Internet with Internet service providers).

The flowcharts and block diagrams in the drawings illustrate the architecture, functions, and operations of possible embodiments of systems, methods, and computer program products according to various embodiments of the present disclosure. In this regard, each block in the flowchart or block diagram may represent a module, a program segment, or a part of the code, which contains one or more executable instructions for implementing specified logical functions. It should also be noted that in some alternative implementations, the functions labeled in the blocks may also occur in a different order than those labeled in the drawings. For example, two blocks shown in succession can actually be executed substantially in parallel, and sometimes they can be executed in the reverse order, depending on the functions involved. It should also be noted that each block in the block diagram and/or flowchart, and the combination of blocks in the block diagram and/or flowchart, can be realized by a dedicated hardware-based system that performs specified functions or operations, or can be realized by a combination of dedicated hardware and computer instructions.

The units described in the embodiments of this disclosure can be realized by software or hardware. In some cases, the name of the unit does not limit the module itself.

The functions described above herein can be at least partially performed by one or more hardware logic components. For example, without limitation, exemplary types of hardware logic components that can be used may include: field programmable gate array (FPGA), application specific integrated circuit (ASIC), application specific standard product (ASSP), system on chip (SOC), complex programmable logic device (CPLD) and so on.

In the context of the present disclosure, a machine-readable medium can be a tangible medium that can contain or store a program for use by or in connection with an instruction execution system, apparatus, or device. The machine-readable medium can be a machine-readable signal medium or a machine-readable storage medium. The machine-readable medium may include, but not limited to, electronic, magnetic, optical, electromagnetic, infrared, or semiconductor systems, devices or equipment, or any suitable combination of the foregoing. More specific examples of machine-readable storage medium may include electrical connections based on one or more wires, portable computer disks, hard disks, random access memories (RAM), read-only memories (ROM), erasable programmable read-only memories (EPROM or flash memories), optical fibers, compact disk read-only memories (CD-ROMs), optical storage devices, magnetic storage devices, or any suitable combination of the above.

The above description is only a preferred embodiment of the present disclosure and an illustration of the applied technical principles. Those skilled in the art should understand that the scope of the disclosure involved in this disclosure is not limited to the technical solutions formed by the specific combination of the above technical features, but also covers the technical solutions formed by the above technical features or other technical solutions formed by any combination of equivalent features, without departing from the above concept of the present disclosure. For example, a technical solution formed by replacing the above-mentioned features with (but not limited to) technical features with similar functions disclosed in this disclosure.

In addition, while operations are depicted in a particular order, this should not be understood as requiring that the operations be performed in the particular order shown or to be performed in sequential order. Under certain circumstances, multitasking and parallel processing may be advantageous. Likewise, while the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

What is claimed is:

1. A live stream control method, the method comprising:
  displaying a live stream page of a live stream;
  in response to a first trigger operation for exiting the live stream, in response to a duration a user has watched the live stream is greater than or equal to a duration threshold, stopping displaying the live stream page of the live stream, and associating the live stream to a control, wherein the control is an existing control in an application program having a live stream function, wherein the associating the live stream to the control comprises displaying an identification of the target live stream on the control; and
  in response to a second trigger operation for the control in a first preset duration since the identification of the live stream is displayed on the control, in response to the live stream being not over, displaying the live stream page of the live stream, or displaying a live preview page that presents at least one live stream comprising the live stream.

2. The method of claim 1, wherein the live preview page presents a live video preview stream or preview cover of the at least one live stream thereon.

3. The method of claim 1, wherein, after the associating the live stream to the control, the method further comprises:
  in response to the second trigger operation for the control, if the live stream is over, displaying an off page of the live stream, or a record playback page of the live stream;
  wherein the off page presents at least one of live ending prompt message, live guide information and live recommendation information.

4. The method of claim 1, wherein, the stopping displaying a live stream page of the live stream, and associating the live stream to the control, comprises:
  stopping displaying the live stream page of the live stream, displaying a first page comprising the control, and displaying the identification of the live stream on the control;
  or,
  stopping displaying the live stream page of the target live stream, associating the live stream to the control on the first page, and displaying a second page.

5. The method of claim 4, wherein, after the displaying the identification of the live stream on the control, the method further comprises:
  after a second preset duration, stopping displaying the identification of the live stream on the control.

6. The method of claim 5, wherein, after the second preset duration, stopping displaying the identification of the live stream on the control, comprises:
  after the second preset duration, stopping displaying the identification of the live stream on the control according to a first preset effect.

7. The method of claim 4, wherein, the stopping displaying the live live stream page of the live stream, and displaying the first page comprising the control, displaying the identification of the live stream on the control, comprises:
  stopping displaying the live stream page of the live stream according to a second preset effect, and displaying a first page comprising the control, displaying the identification of the live stream on the control.

8. An electronic device, comprising:
  a memory and a processor,
  wherein the memory stores a computer program, which, when executed by the processor, causes the processor to implement:
  displaying a live stream page of a live stream;
  in response to a first trigger operation for exiting the live stream, in response to a duration a user has watched the live stream is greater than or equal to a duration threshold, stopping displaying the live stream page of the live stream, and associating the live stream to a control, wherein the control is an existing control in an application program having a live streaming-function, wherein the associating the target live stream to the control comprises displaying an identification of the live stream on the control; and
  in response to a second trigger operation for the control in a first preset duration since the identification of the live stream is displayed on the control, in response to live stream in the live stream being not over, displaying the live stream page of the live stream, or displaying a live preview page that presents at least one live stream comprising the live stream.

9. The electronic device of claim 8, wherein the live preview page presents a live video preview stream or preview cover of at least one live stream thereon.

10. The electronic device of claim 8, wherein, the computer program, when executed by the processor, causes the processor to implement:

after the associating the live stream to a control, in response to a second trigger operation for the control, if live stream in the live stream is over, displaying an off page of the live stream, or a record playback page of the live stream;

wherein the off page presents at least one of live ending prompt message, live guide information and live recommendation information.

11. The electronic device of claim 8, wherein, the stopping displaying a live stream page of the target live stream, and associating the live stream to a control, comprises:

stopping displaying the live stream page of the live stream, and displaying a first page comprising the control, displaying the identification of the live stream on the control;

or, stopping displaying the live stream page of the live stream, associating the live stream to the control on the first page, and displaying a second page.

12. The electronic device of claim 11, wherein, the computer program, when executed by the processor, causes the processor to implement:

after the displaying the identification of the live stream on the control, after a second preset duration, stopping displaying the identification of the live stream on the control according to a first preset effect.

13. The electronic device of claim 11, wherein, the stopping displaying the live stream page of the target live stream, and displaying a first page comprising the control, displaying the identification of the live stream on the control, comprises:

stopping displaying the live stream page of the live stream according to a second preset effect, and displaying a first page comprising the control, displaying the identification of the live stream on the control.

14. A non-transitory computer-readable storage medium storing a computer program which, when executed by a processor, causes the processor to implement:

displaying a live stream page of a live stream;

in response to a first trigger operation for exiting the live stream, in response to a duration a user has watched the live stream is greater than or equal to a duration threshold, stopping displaying the live stream page of the live stream, and associating the live stream to a control, wherein the control is an existing control in an application program having a live stream function, wherein the associating the live stream to the control comprises displaying an identification of the live stream on the control; and in response to a second trigger operation for the control in a first preset duration since the identification of the live stream is displayed on the control, in response to live stream in the live stream being not over, displaying the live stream page of the live stream, or displaying a live preview page that presents at least one live stream comprising the live stream.

15. The non-transitory computer-readable storage medium of claim 14, wherein the live preview page presents a live video preview stream or preview cover of at least one live stream thereon.

16. The non-transitory computer-readable storage medium of claim 14, wherein, the computer program, when executed by the processor, causes the processor to implement:

after the associating the live stream to a control, in response to a second trigger operation for the control, if live stream in the live stream is over, displaying an off page of the target live stream, or a record playback page of the live stream;

wherein the off page presents at least one of live ending prompt message, live guide information and live recommendation information.

17. The non-transitory computer-readable storage medium of claim 14, wherein, the stopping displaying a live stream page of the live stream, and associating the live stream to a control, comprises:

stopping displaying the live stream page of the live stream, and displaying a first page comprising the control, displaying the identification of the live stream on the control;

or, stopping displaying the live stream page of the live stream, associating the live stream to the control on the first page, and displaying a second page.

18. The non-transitory computer-readable storage medium of claim 17, wherein, the computer program, when executed by the processor, causes the processor to implement:

after the displaying the identification of the live stream on the control, after a second preset duration, stopping displaying the identification of the live stream on the control according to a first preset effect.

19. The non-transitory computer-readable storage medium of claim 17, wherein, the stopping displaying the live stream page of the live stream, and displaying a first page comprising the control, displaying the identification of the live stream on the control, comprises:

stopping displaying the live stream page of the live stream according to a second preset effect, and displaying a first page comprising the control, displaying the identification of the live stream on the control.

* * * * *